United States Patent [19]

Villata

[11] Patent Number: 5,031,511
[45] Date of Patent: Jul. 16, 1991

[54] PISTON FOR AN HYDRAULIC BRAKE, IN PARTICULAR FOR AUTOMOTIVE VEHICLES

[75] Inventor: Gino Villata, Buttigliera D'Asti, Italy

[73] Assignee: Valeo, Paris, France

[21] Appl. No.: 512,179

[22] Filed: Apr. 20, 1990

[30] Foreign Application Priority Data

Apr. 25, 1989 [FR] France ................ 89 05449

[51] Int. Cl.⁵ ........................... F01B 29/00
[52] U.S. Cl. ........................ 92/128; 92/176;
92/255; 92/256; 403/261; 188/71.6; 188/72.4
[58] Field of Search ............... 92/107, 128, 129, 176,
92/255, 256, 259; 403/261, 259; 188/71.6, 72.4, 264 G

[56] References Cited

U.S. PATENT DOCUMENTS

| 3,274,904 | 9/1966 | Jacoby. | |
|---|---|---|---|
| 3,405,554 | 11/1970 | Burnett | 188/264 G |
| 3,684,061 | 8/1972 | Ogawa et al. | 188/264 G |
| 3,915,263 | 10/1975 | Courbot | 188/264 G |
| 4,572,334 | 2/1986 | Villata | 188/264 G |
| 4,581,985 | 4/1986 | Villata. | |
| 4,798,270 | 1/1989 | Schneider et al. | 188/264 G |

FOREIGN PATENT DOCUMENTS

| 77950 | 1/1949 | Czechoslovakia | 403/261 |
|---|---|---|---|
| 3049290 | 12/1981 | Fed. Rep. of Germany | 92/255 |
| 1280038 | 4/1961 | France | 403/261 |
| 2005742 | of 1969 | France. | |
| 2314399 | 1/1977 | France. | |
| 2523244 | 3/1982 | France. | |
| 2545897 | 5/1983 | France. | |
| 2548321 | 11/1985 | France. | |
| 985628 | 3/1965 | United Kingdom | 188/264 G |
| 2083155 | 3/1982 | United Kingdom | 403/261 |

Primary Examiner—Edward K. Look
Assistant Examiner—Thomas E. Denion
Attorney, Agent, or Firm—Charles A. Brown

[57] ABSTRACT

A piston for an hydraulic brake is of the kind comprising an insulating core member and a cup member, joined together by fastening means arranged between the core and cup members.

This fastening means is constituted as follows. The base portion of the cup member has a central projection, while the core member has a central cavity which is open at the level of the outer projecting surface of the cup member and which is closed by an end wall forming the base of the cavity, with the projection from the cup member base portion extending through a hole in this base wall. An axially acting resilient means is engaged on the free end of the projection within the cavity and engages against that face of the wall which is directed away from the base portion of the cup member. The invention is particularly applicable to the control of hydraulic brakes, in particular for automotive vehicles.

4 Claims, 1 Drawing Sheet

PISTON FOR AN HYDRAULIC BRAKE, IN PARTICULAR FOR AUTOMOTIVE VEHICLES

FIELD OF THE INVENTION

The present invention relates to a piston for an hydraulic brake, in particular for automotive vehicles, and to an hydraulically controlled brake including such a piston, the piston being of the kind comprising an insulating core member and a cup member, with fastening means between the core member or body of the piston and the cup member, joining these two members together.

BACKGROUND OF THE INVENTION

A piston of the above kind is described in, for example, U.S. Pat. No. 4,581,985 and the corresponding French published patent application No. FR 2 523 244A. In those documents, the piston includes, firstly a member in the form of a cup member having a base portion and adapted to be engaged in a cylinder of the hydraulic brake, and secondly an insulating core member of heat insulating material, which is engaged at least partly in the cup member and which projects from the latter, the core member being fastened to the cup member by fastening means with a force fit. The fastening means are localised, and affect only part of the side walls of the core and cup members.

Such an arrangement complicates assembly and manufacture. In order to overcome this disadvantage, the piston itself may be assembled by bolting it to the insulating body in the manner described in French published patent application No. FR 2 005 742A. However, an arrangement of this kind is equally unsatisfactory, because it requires the thickness of the base portion of the cup member to be increased.

DISCUSSION OF THE INVENTION

An object of the present invention is to overcome these disadvantages, so as to provide a novel fastening means between a cup member and an insulating core member such as to facilitate both their manufacture and their assembly together, while giving other advantages.

In accordance with the invention, a piston of the kind comprising, firstly a member in the form of a cup member having a base portion, the cup member being adapted to be engaged in a cylinder of an hydraulic brake, and secondly an insulating core member of heat insulating material, which is engaged at least partly within the cup member and which projects from the latter, the core member being fastened to the cup member by fastening means, is characterised in that, to constitute the fastening means, the base portion of the cup member has a central projection, while the core member has a central cavity which is open at the level of its axial surface projecting beyond the cup member, and which is closed by a wall defining the base of the cavity, the piston being further characterised in that the projection extends through a hole formed in the said wall, and in that an axially acting resilient means is engaged on the free end of the projection within the cavity and bears on the said wall, on the face of the latter which is directed away from the base portion of the cup member, whereby to fasten the cup member to the core member.

The invention enables the assembly operation to be carried out by simply offering up the core member axially onto the projection, followed by fitting of the axially acting resilient means, which is preferably in the form of a Belleville ring.

It will be noted that the core member as well as the cup member may be readily formed by moulding, and to this end the cavity of the core member is preferably made divergent towards the projecting outer face of the core member.

It will be appreciated that in a first embodiment, an air cushion can be formed between the side walls of the cup member and those of the core member, with the core member being in engagement against the base portion of the cup member under the biassing action of the axially acting resilient means.

In a second embodiment, the core member may be mounted on the cup member in such a way that it can tilt with respect to the latter. This is achieved by means of complementary spherical portions of the two members, against the force exerted by the axially acting resilient means. The projection of the cup member extends through the said hole in the base wall of the core member with a clearance around it, while an air cushion exists between the base portion of the cup member and the base of the core member. Using this arrangement, the size of the cup member, and the need for sealing between the cup member and its associated cylinder, are reduced. It will be realised that this reduces the danger of jamming between the cup member and the cylinder in which it slides.

The description that follows illustrates the invention, by way of example only and with reference to the accompanying drawings.

DESCRIPTION OF PREFERRED EMBODIMENTS OF THE INVENTION

Figure 1:
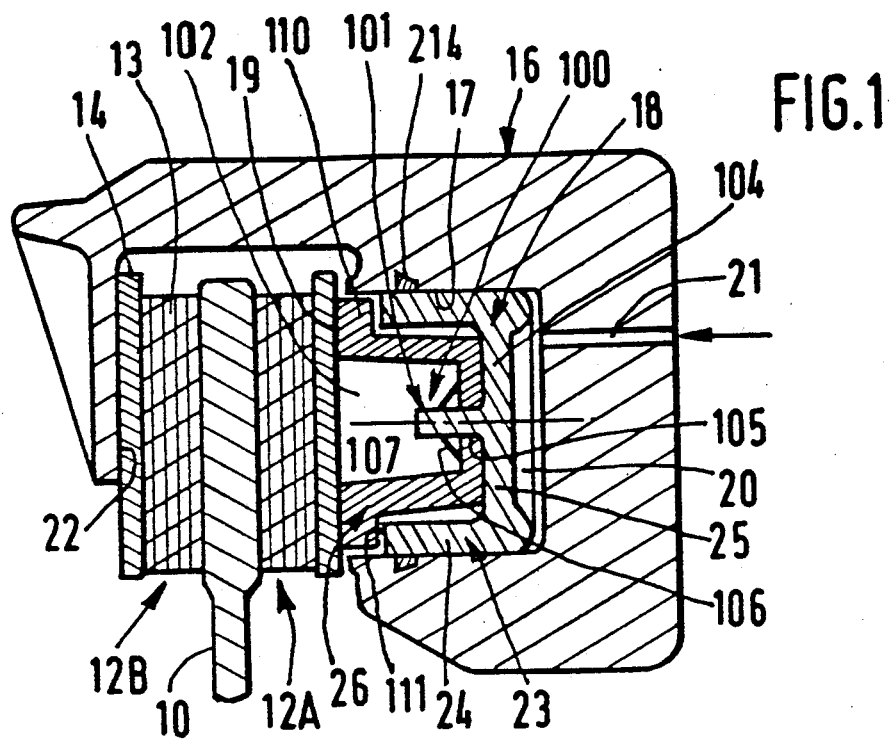
FIG. 1 is a general diagrammatic view in cross section, of a brake in accordance with the invention, the piston of which includes a cup member in which is received a core member of heat insulating material.

The invention is seen in FIG. 1 applied to an hydraulically controlled disc brake, in particular for automotive vehicles. Referring to FIG. 1, the reference 10 designates the brake disc of the brake, which has two rotating working zones opposed to each other and adapted to receive, in frictional contact with it, two friction elements 12A and 12B. These friction elements comprise brake pads, each of width is a liner of friction material 13 secured to a metal support 14. Each brake pad 12A, 12B is caused to bear frictionally against the corresponding working zone of the brake disc 10, through the free surface of the liner 13 which is turned away from the corresponding support 14. The force necessary to cause each brake pad 12A, 12B to grip against the disc 10 is transmitted through the support 14.

The brake includes a stirrup 16 which embraces the disc 10 and in which the brake pads 12A and 12B are mounted.

The stirrup 16 defines the body of a cylinder 17, in which an annular piston 18 is mounted for sliding movement. The piston 18 has a projecting or terminal axial face 19, referred to as the outer, or outer projecting, face, through which it is caused to exert a thrust against the support 14 of the brake pad 12A.

The piston 18 defines in the cylinder 17 a control chamber 20 which is filled with hydraulic liquid, for example an oil. A duct 21 communicates with the chamber 20, to allow a pressure to be introduced into the latter so as to be developed within it.

The stirrup 16 also includes a reaction face 22, against which the support 14 of the other brake pad 12B abuts. The brakes pads 12A and 12B are thus adapted to be gripped against the rotating working surfaces of the brake disc 10 under the thrust exerted by the piston 18 which is slidingly mounted in the cylinder 17, in response to development of a pressure in the control chamber 20.

The piston 18 includes an annular member in the form of a cup member 23, which has a laterally extending cylindrical wall 24, engaged in the cylinder 17, and a base portion 25 adjacent to the control chamber 20. In this example, the cup member 23 is a steel casting. In a modification, it may be of steel or other materials. The piston also includes a cylindrical, annular core member 26 of heat insulating material. This core member is housed at least partly within the cup member 23, so as to project from the latter, so that the outer face 19 of the piston is defined by the insulating core member 26 and not by the cup member 23.

In this example, the material of the core member 26 is a brake friction liner material containing fibres, fillers and a binder, such that the piston is of mechanically strong material. This material may be for example include a percentage by weight of 30% fibres of glass, carbon or asbestos, 50% of mineral fillers such as a calcium carbonate filler, and 20% of a binder such as a phenolic resin.

The core member 26 and the cup member 23 are joined to each other through fastening means 100, which are constituted by a projection 101 extending axially from the base portion 25 of the cup member 23, together with a central cavity 102 of the core member 26 which is open at the level of the outer face 19 of the core member 26, the cavity 102 being closed by a wall 104 which defines the base of the cavity 102. The projection 101 of the cup member 23 extends through a hole 105 formed in the wall 104. An axially acting resilient member 106 is engaged on the free end 107 of the projection 101 within the cavity 102, and bears on the wall 104, on the face of the latter which faces away from the base portion 25, so fastening the core member 26 to the cup member 23.

As can be seen in FIG. 1, the base of the core member 26, remote from the surface 19, is in contact with the base portion 25 of the cup member, while its cylindrical side wall is spaced radially from the cylindrical wall 24 of the cup member. This arrangement avoids the need for precise dimensioning.

The axially acting resilient member 106 is a simple spring ring in the form of a Belleville ring, which grips the projection 101 and exerts a thrust on the face of the wall 104 that is directed away from the base portion 25 of the cup member 23. The cavity 102 is divergent towards the outer face 19. The core member 26 is formed by moulding and has a collar portion 110, which is in contact with the support 14 and interposed between the latter and the free end 111 of the cup member 23. The collar portion 110 is in line with the free end 111. An axial clearance exists between the collar portion 110 and the end 111. The cup member 23 is thus well insulated, with the Belleville ring 106 biassing the core member 26 into contact with the base portion 25. The projection 101 has a shape which is complementary to that of the hole 105, and is fitted with a mounting clearance in the latter. It is cylindrical with a circular cross section.

Figure 2:
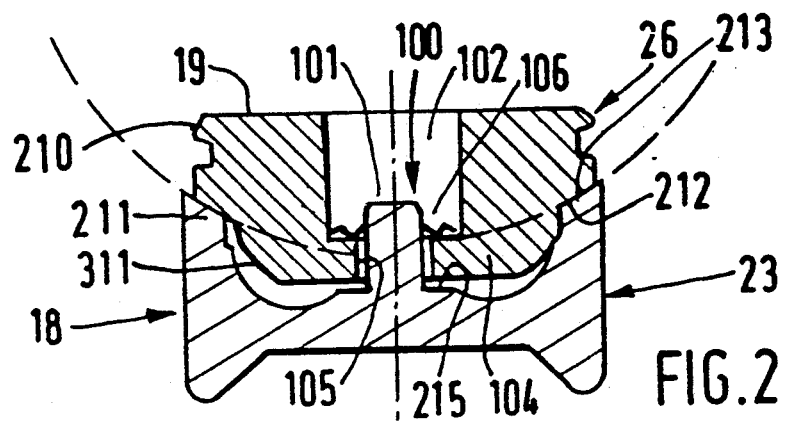
FIG. 2 is a view in axial cross section of a piston in accordance with the invention in a second embodiment of the latter.
Figure 3:
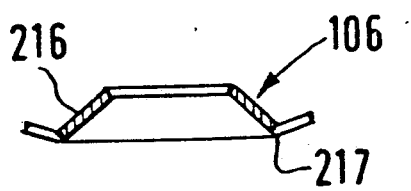
FIG. 3 is a view on a larger scale and in axial cross section, showing the axially acting spring ring seen in FIG. 2.
Figure 4:
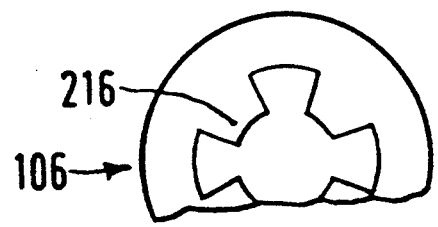
FIG. 4 is a partial front view of the same spring ring.

In FIG. 2, the core member 26 is in contact with the free end 211 of the cup member 23, through a shouldered portion 210, and has a tail portion 311 which extends the shouldered portion 210 and is engaged in the cup member 23. In this case, an axial clearance exists between the core member 26 and the base portion 25, so as to form an air cushion between them, with the axially acting resilient member 106 biassing the core member 26 towards the free end 211 in the same way as has been described above. The wall 104 is formed in the tail portion 311, and the shouldered portion 210 includes the outer projecting face 19. It will also be noted that the shouldered portion 210 has a groove for receiving a seal (not shown) for preventing the ingress of dust.

The projection 101 extends with a clearance through the hole 105 formed in the wall 104. It is a significant feature that, for contact with the free end 211, the shouldered portion 210 has a surface 212 which is in the shape of a portion of a sphere, while the end portion 211 has a surface 213, also the shape of a portion of a sphere and complementary to the surface 212. The sphere defined by these surfaces is indicated by a broken line in FIG. 2. In this particular example, the surface 212 is convex, while the surface 213 is concave. This arrangement, and the clearance provided in the hole 105, allows the core member 26 to tilt with respect to the cup member 23, so that a seal (seen at 214 in FIG. 1), which is provided between the cylinder 17 and the cup member 23, can be inserted. The projection 101 is formed in a thickened portion 215 of the base portion 25.

As before, the cavity 102 is formed during the moulding of the core member 26. The axially acting resilient member here comprises a Belleville ring with a crenellated internal peripheral surface defining tabs 216 which are joined to the main part of the ring 106 through a rounded region 217 for point contact with the wall 104. The tabs 216 may be curved back at the outset, or they may be flat, in which case they become curved back while the ring 106 is being fitted over the projection 101.

The ring 106 may of course be provided on the piston shown in FIG. 1.

As will be understood, relative movement is also possible between the core member 26 and the cup member 23, with the ring 106 acting as a return spring, exerting a force which is determined in accordance with the particular application. In consequence, the cup member 26 is resiliently coupled to the cup member 23, in such a way that the additional lateral or tangential forces acting on the cup member 23 and generated due to the contacts of the brake pads 12A, 12B with the brake disc 10 and core member 26, are minimised.

As will appear from this description and from the drawings, the heat generated by friction is prevented, mainly by the heat insulating core member, from raising the temperature of the hydraulic liquid in the control chamber above a value that could cause loss of the properties of this liquid and its operating efficacy. In all these cases, it is possible to form an air cushion which is favourable to a reduction in the temperature of the hydraulic fluid.

The cavity in the core member allows the latter to contain enough material to be able to perform its function satisfactorily.

It will be noted that the free end of the projection 101 is chamfered, in order to facilitate the fitting of the ring 106 so as to anchor it to the projection.

The present invention is of course not limited to the embodiments described, and in particular the outer projecting face 19 of the piston may be faced with a material which is resistant to wear.

The cross section of the projection 101 may be square. In FIG. 2, this projection may be of frusto conical shape, having regard to the clearances.

Finally, the hydraulic clutch may be of the twin disc type as described in French published patent application No. FR -A-2 314 399.

What is claimed is:

1. A piston for a hydraulic brake, said piston comprising a cup member defining a base portion and a cylindrical side wall for engagement in a hydraulic brake cylinder, a core member of heat insulating material, and fastening means fastening said core member at least partly within said cup member but projecting from said cup member, wherein said base portion of the cup member includes an axial projection and said core member has a central cavity which is open at the level of an outer face of said core member at its end remote from said base portion of said cup member, said core member defining at its other end a wall which constitutes a base of said cavity and which has a hole therethrough, said projection extending through said hole into said cavity, said piston further including axially acting resilient means in the form of a Belleville ring which is engaged on said projection within said cavity and which bears on a surface of said wall that faces away from said base portion of said cup member, said projection, hole and resilient means together constituting said fastening means for fastening said core member to said cup member, said Belleville ring having a crenellated internal peripheral surface defining tabs joined to an outer part of said Belleville ring through a rounded region for point contact with said core member wall and said projection.

2. A piston for a hydraulic brake, said piston comprising a cup member defining a base portion and a cylindrical side wall for engagement in a hydraulic brake cylinder, a core member of heat insulating material, and fastening means fastening said core member at least partly within said cup member but projecting from said cup member, wherein said base portion of the cup member includes an axial projection and said core member has a central cavity which is open at the level of an outer face of said core member at its end remote from said base portion of said cup member, said core member defining at its other end a wall which constitutes a base of said cavity and which has a hole therethrough, said projection extending through said hole into said cavity, said piston further including axially acting resilient means which is engaged on said projection within said cavity and which bears on a surface of said wall that faces away from said base portion of said cup member, said projection, hole and resilient means together constituting said fastening means for fastening said core member to said cup member, said cavity in said core member being divergent towards said outer face of said core member.

3. A piston for a hydraulic brake, said piston comprising a cup member defining a base portion and a cylindrical side wall of engagement in a hydraulic brake cylinder, a core member of heat insulating material, and fastening means fastening said core member at least partly within said cup member but projecting from said cup member, wherein said base portion of the cup member includes an axial projection and said core member has a central cavity which is open at the level of an outer face of said core member at its end remote from said base portion of said cup member, said core member defining at its other end a wall which constitutes a base of said cavity and which has a hole therethrough, said projection extending through said hole into said cavity, said piston further including axially acting resilient means which is engaged on said projection within said cavity and which bears on a surface of said wall that faces away from said base portion of said cup member, said projection, hole and resilient means together constituting said fastening means for fastening said core member to said cup member, said core member including a shouldered portion on which said outer projecting face is formed, and a tail portion engaged in said cup member, said shouldered portion having a surface in the shape of a portion of a sphere, while said free end of said cup member has a further surface, having the shape of a portion of a sphere complementary to that of said surface of said shouldered portion, said two spherical surfaces being in contact with each other.

4. A piston according to claim 3, wherein said surface of said shouldered portion is convex, while the corresponding surface of said free end of said cup member is concave.

* * * * *